United States Patent
Baumann et al.

(10) Patent No.: US 10,557,412 B2
(45) Date of Patent: Feb. 11, 2020

(54) SYSTEMS FOR REDUCING DEFLECTION OF A SHROUD THAT RETAINS FAN EXIT STATORS

(71) Applicant: UNITED TECHNOLOGIES CORPORATION, Farmington, CT (US)

(72) Inventors: Paul W. Baumann, Amesbury, MA (US); Brian Barainca, Kennebunk, ME (US); Rolf Thorsen, Deep River, CT (US); Mark E. Simonds, Cape Neddick, ME (US); Gary F. Fowler, Strafford, NH (US); Hector M. Pinero, Middletown, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 303 days.

(21) Appl. No.: 15/608,547

(22) Filed: May 30, 2017

(65) Prior Publication Data

US 2018/0347465 A1 Dec. 6, 2018

(51) Int. Cl.
*F02C 7/055* (2006.01)
*F01D 21/04* (2006.01)
*F01D 11/12* (2006.01)
*F01D 5/24* (2006.01)
*F02C 7/045* (2006.01)
*F02C 7/05* (2006.01)

(52) U.S. Cl.
CPC .............. *F02C 7/055* (2013.01); *F01D 5/24* (2013.01); *F01D 11/122* (2013.01); *F01D 21/045* (2013.01); *F02C 7/045* (2013.01); *F02C 7/05* (2013.01)

(58) Field of Classification Search
CPC .. F02C 7/055; F02C 7/045; F02C 7/05; F01D 5/24; F01D 11/122; F01D 21/045
See application file for complete search history.

(56) References Cited

U.S. PATENT DOCUMENTS 3,326,523 A 6/1967 Bobo
4,720,236 A * 1/1988 Stevens .................. F01D 9/042
415/116

(Continued)

FOREIGN PATENT DOCUMENTS

DE 102013017713 4/2015
EP 2204539 7/2010

(Continued)

OTHER PUBLICATIONS

European Patent Office, European Search Report dated Oct. 11, 2018 in Application No. 18174032.5-1006.

*Primary Examiner* — Joseph J Dallo
*Assistant Examiner* — Kurt Philip Liethen (57) ABSTRACT

An outer diameter shroud for retaining a stator of a gas turbine engine having an axis includes an annular body positioned around the axis, extending in an axial direction, and defining a plurality of slots each configured to receive a portion of one of a plurality of stators. The outer diameter shroud further includes a shroud flange coupled to the annular body, extending in a direction perpendicular to the annular body, and configured to be fastened to a case of the gas turbine engine.

19 Claims, 5 Drawing Sheets

(56) References Cited

U.S. PATENT DOCUMENTS

| | | | |
|---|---|---|---|
| 6,409,472 B1 * | 6/2002 | McMahon | F01D 5/3023 |
| | | | 415/119 |
| 6,655,912 B2 | 12/2003 | Bos | |
| 6,910,860 B2 * | 6/2005 | Glover | F01D 9/042 |
| | | | 415/191 |
| 8,459,944 B2 | 6/2013 | Hamana | |
| 8,696,311 B2 | 4/2014 | Eleftheriou et al. | |
| 8,966,756 B2 * | 3/2015 | Feigleson | F01D 9/042 |
| | | | 29/458 |
| 8,998,574 B2 | 4/2015 | Menheere et al. | |
| 9,506,361 B2 | 11/2016 | Fielding et al. | |
| 2010/0034648 A1 * | 2/2010 | Robertson | F01D 25/28 |
| | | | 415/199.4 |
| 2011/0110783 A1 * | 5/2011 | Addis | B23P 6/005 |
| | | | 416/219 R |
| 2014/0169972 A1 * | 6/2014 | Suciu | F01D 5/225 |
| | | | 416/189 |
| 2015/0118039 A1 * | 4/2015 | Aschenbruck | F01D 25/246 |
| | | | 415/209.2 |
| 2015/0377123 A1 * | 12/2015 | Adams | F02K 3/06 |
| | | | 60/805 |
| 2016/0290168 A1 | 10/2016 | Karafillis et al. | |

FOREIGN PATENT DOCUMENTS

| | | |
|---|---|---|
| FR | 2961850 | 12/2011 |
| WO | 0046489 | 8/2000 |
| WO | 2014105573 | 7/2014 |

\* cited by examiner

SYSTEMS FOR REDUCING DEFLECTION OF A SHROUD THAT RETAINS FAN EXIT STATORS

FIELD

The present disclosure is directed to systems for reducing deflection of a shroud of a gas turbine engine and, more particularly, to systems for reducing deflection of an outer diameter shroud that retains fan exit stators of a gas turbine engine.

BACKGROUND

Gas turbine engines include a compressor section, a turbine section, and a combustor section. Many gas turbine engines also include a fan that is driven by the turbine section. The fan generates a core airflow that is received by the compressor section and a bypass airflow that bypasses the compressor, turbine, and combustor sections and generates thrust. A set of stators called fan exit stators may be located upstream from the compressor and may condition the core airflow. It is undesirable for the stators to become dislodged in response to ingestion of an object, such as a bird, in the core airflow.

SUMMARY

Disclosed herein is an outer diameter shroud for retaining a stator of a gas turbine engine having an axis. The outer diameter shroud includes an annular body positioned around the axis, extending in an axial direction, and defining a plurality of slots each configured to receive a portion of one of a plurality of stators. The outer diameter shroud further includes a shroud flange coupled to the annular body, extending in a direction perpendicular to the annular body, and configured to be fastened to a case of the gas turbine engine.

In any of the foregoing embodiments, the plurality of stators includes fan exit stators configured to condition a core airflow received from a fan section of the gas turbine engine.

Any of the foregoing embodiments may further include a flange transition that is curved, extends from the annular body to the shroud flange, and has a flange transition thickness that is greater than a body thickness of the annular body and is also greater than a flange thickness of the shroud flange.

In any of the foregoing embodiments, the case is a front center body of the gas turbine engine.

In any of the foregoing embodiments, the shroud flange is coupled to an aft end of the annular body and formed integrally with the annular body.

Any of the foregoing embodiments may further include a lip extending axially forward from the annular body away from the shroud flange, and a lip transition that is curved, extends from the annular body to the lip, and has a lip transition thickness that is greater than a body thickness of the annular body and is also greater than a lip thickness of the lip.

Any of the foregoing embodiments may further include a bracket extending from the shroud flange away from the annular body in the axial direction, the bracket formed integrally with the shroud flange and configured to be coupled to a splitter of the gas turbine engine.

In any of the foregoing embodiments, the annular body has a body axial length that is greater than an edge axial length of an outer diameter edge of each of the plurality of stators.

In any of the foregoing embodiments, the annular body has a forward end and an aft end that is positioned nearer the axis than the forward end.

In any of the foregoing embodiments, the shroud flange defines a plurality of fastener holes configured to receive fasteners for fastening the shroud flange to the case of the gas turbine engine.

Also described is a system for retaining a stator of a gas turbine engine having an axis. The system includes an outer diameter shroud having an annular body defining a plurality of slots each configured to receive a portion of one of a plurality of stators, and a bayonet extending aft from the annular body and defining a bayonet slot. The system further includes an annular case having a case body and a hook that includes a first portion configured to be received by the bayonet slot and a second portion configured to extend over a portion of the outer diameter shroud to resist radially outward movement of the outer diameter shroud relative to the axis.

In any of the foregoing embodiments, the first portion is a radial portion extending radially outward from the case body and the second portion is an axial portion extending axially forward from the radial portion, the radial portion configured to be received by the bayonet slot and the axial portion configured to extend over the annular body.

In any of the foregoing embodiments, the first portion is a radial portion extending radially outward from the case body and the second portion is a circumferential portion extending in a circumferential direction from the radial portion, the radial portion configured to be received by the slot and the circumferential portion configured to extend over the bayonet.

In any of the foregoing embodiments, the annular case is a front center body of the gas turbine engine.

In any of the foregoing embodiments, the plurality of stators includes fan exit stators configured to condition a core airflow received from a fan section of the gas turbine engine.

In any of the foregoing embodiments, the outer diameter shroud includes a forward outer diameter shroud and an aft outer diameter shroud, and the bayonet is coupled to the aft outer diameter shroud.

Also described is a system for retaining a stator of a gas turbine engine having an axis. The system includes an outer diameter shroud having an annular shape and defining a plurality of slots each configured to receive a portion of one of a plurality of stators. The system further includes an annular case configured to be coupled to the outer diameter shroud. The system further includes a band configured to be positioned radially outward from the outer diameter shroud and to contact the outer diameter shroud to resist radially outward movement of the outer diameter shroud relative to the axis.

In any of the foregoing embodiments, wherein the outer diameter shroud includes either a single-piece outer diameter shroud such that the band is configured to contact the single-piece outer diameter shroud, or a combination of a forward outer diameter shroud and an aft outer diameter shroud such that the band is configured to contact the aft outer diameter shroud.

In any of the foregoing embodiments, the band is further configured to be positioned radially outward from the annular case and to contact the annular case and the outer diameter shroud.

In any of the foregoing embodiments, the plurality of stators includes fan exit stators configured to condition a core airflow received from a fan section of the gas turbine engine and the annular case is a front center body of the gas turbine engine.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine. An A-R-C axis is shown in various drawings to illustrate the axial, radial, and circumferential directions, respectively.

As used herein, "radially outward" refers to the direction generally away from the axis of rotation of a turbine engine. As used herein, "radially inward" refers to the direction generally towards the axis of rotation of a turbine engine.

Figure 1:
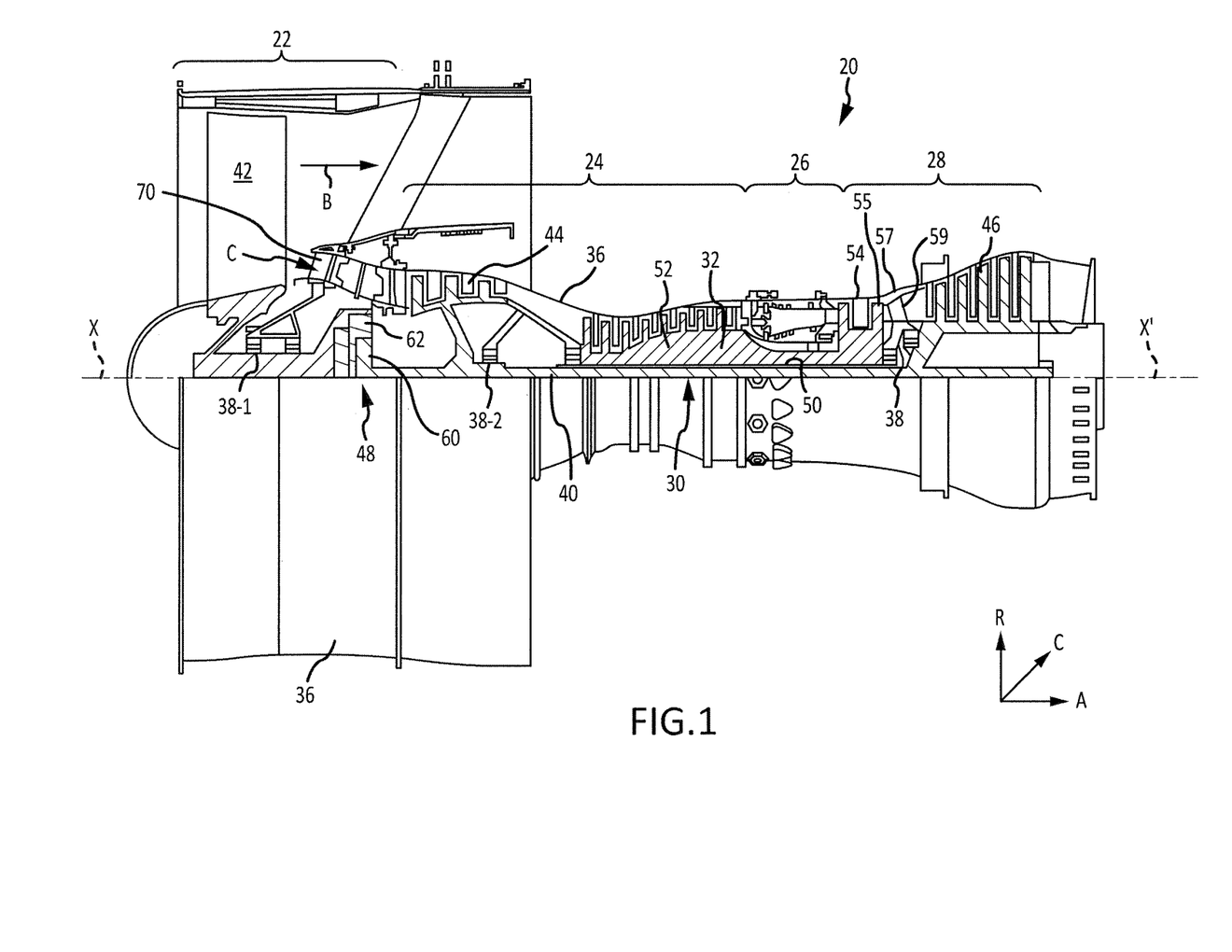
FIG. 1 is a cross-sectional view of an exemplary gas turbine engine, in accordance with various embodiments.

In various embodiments and with reference to FIG. 1, a gas turbine engine 20 is provided. The gas turbine engine 20 may be a two-spool turbofan that generally incorporates a fan section 22, a compressor section 24, a combustor section 26 and a turbine section 28. Alternative engines may include, for example, an augmentor section among other systems or features. In operation, the fan section 22 can drive coolant (e.g., air) along a bypass flow path B while the compressor section 24 can drive coolant along a core flow path C for compression and communication into the combustor section 26 then expansion through the turbine section 28. Although depicted as a two-spool turbofan gas turbine engine 20 herein, it should be understood that the concepts described herein are not limited to use with two-spool turbofans as the teachings may be applied to other types of turbine engines including turbojet, turboprop, turboshaft, or power generation turbines, with or without geared fan, geared compressor or three-spool architectures.

The gas turbine engine 20 may generally comprise a low speed spool 30 and a high speed spool 32 mounted for rotation about an engine central longitudinal axis X-X' relative to an engine static structure 36 or engine case via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 may generally comprise an inner shaft 40 that interconnects a fan 42, a low pressure compressor 44 and a low pressure turbine 46. The inner shaft 40 may be connected to the fan 42 through a geared architecture 48 that can drive the fan 42 at a lower speed than the low speed spool 30. The geared architecture 48 may comprise a gear assembly 60 enclosed within a gear housing 62. The gear assembly 60 couples the inner shaft 40 to a rotating fan structure. The high speed spool 32 may comprise an outer shaft 50 that interconnects a high pressure compressor 52 and high pressure turbine 54. A combustor 26 may be located between high pressure compressor 52 and high pressure turbine 54. A mid-turbine frame 57 of the engine static structure 36 may be located generally between the high pressure turbine 54 and the low pressure turbine 46. Mid-turbine frame 57 may support one or more bearing systems 38 in the turbine section 28. The inner shaft 40 and the outer shaft 50 may be concentric and rotate via bearing systems 38 about the engine central longitudinal axis X-X', which is collinear with their longitudinal axes. As used herein, a "high pressure" compressor or turbine experiences a higher pressure than a corresponding "low pressure" compressor or turbine.

The airflow of core flow path C may be received and conditioned by a fan exit stator 70. After conditioning, the airflow of core flow path C may be compressed by the low pressure compressor 44 then the high pressure compressor 52, mixed and burned with fuel in the combustor 26, then expanded over the high pressure turbine 54 and the low pressure turbine 46. The turbines 46, 54 rotationally drive the respective low speed spool 30 and high speed spool 32 in response to the expansion.

The gas turbine engine 20 may be, for example, a high-bypass ratio geared engine. In various embodiments, the bypass ratio of the gas turbine engine 20 may be greater than about six (6). In various embodiments, the bypass ratio of the gas turbine engine 20 may be greater than ten (10). In various embodiments, the geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). In various embodiments, the bypass ratio of the gas turbine engine 20 is greater than about ten (10:1). In various embodiments, the diameter of the fan 42 may be significantly larger than that of the low pressure compressor 44, and the low pressure turbine 46 may have a pressure ratio that is greater than about five (5:1). The low pressure turbine 46 pressure ratio may be measured prior to the inlet of the low pressure turbine 46 as related to the pressure at the outlet of the low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared engine, such as a geared turbofan, or non-geared engine, such as a turbofan, a turboshaft, or may comprise any gas turbine engine as desired.

In various embodiments, the low pressure compressor 44, the high pressure compressor 52, the low pressure turbine 46, and the high pressure turbine 54 may comprise one or more stages or sets of rotating blades and one or more stages or sets of stationary vanes axially interspersed with the associated blade stages but non-rotating about engine central longitudinal axis X-X'. The compressor and turbine sections 24, 28 may be referred to as rotor systems. Within the rotor systems of the gas turbine engine 20 are multiple rotor disks, which may include one or more cover plates or minidisks. Minidisks may be configured to receive balancing weights or inserts for balancing the rotor systems.

Figure 2:
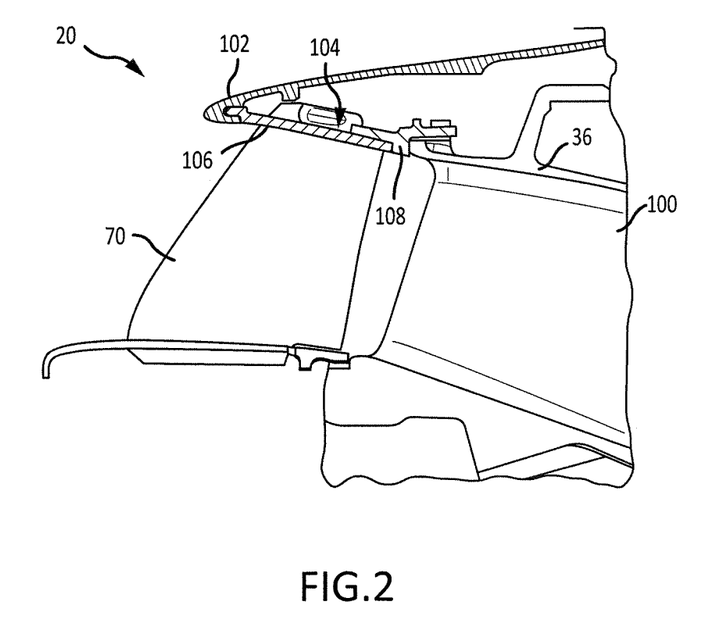
FIG. 2 is a cross-sectional view of a portion of the gas turbine engine of FIG. 1, in accordance with various embodiments.

Referring now to FIGS. 1 and 2, the static structure, or case, 36 may include a front center body (FCB) 100. The FCB 100 may provide structural support for various components of the gas turbine engine 20.

The gas turbine engine 20 may further include a splitter 102 designed to split the airflow from the fan section 22 into the core airflow C and the bypass airflow B. As shown, the core airflow is received by the plurality of fan exit stators 70 which are located at an inlet to the core of the gas turbine engine 20.

An outer diameter shroud 104 may be located radially outward from the fan exit stators 70 and may retain the fan exit stators 70 in place relative to the case 36. In that regard, the outer diameter shroud 104 may be coupled to a portion of the case 36, such as the FCB 100. The outer diameter shroud 104 may further be coupled to the splitter 102. Because the outer diameter shroud 104 may retain the fan exit stators 70 in place, the fan exit stators 70 may undesirably become dislodged in response to sufficient radially outward deflection of the outer diameter shroud 104. In that regard, it is desirable to reduce radially outward deflection of the outer diameter shroud 104.

In various embodiments, the outer diameter shroud 104 may be a single piece or may include a forward outer diameter shroud 106 and an aft outer diameter shroud 108 coupled to the forward outer diameter shroud 106. As described above, it is desirable for the outer diameter shroud 104 to resist movement in the radially outward direction which may occur, for example, during a bird strike (i.e., when a bird is ingested into the core airflow C).

Figure 3:
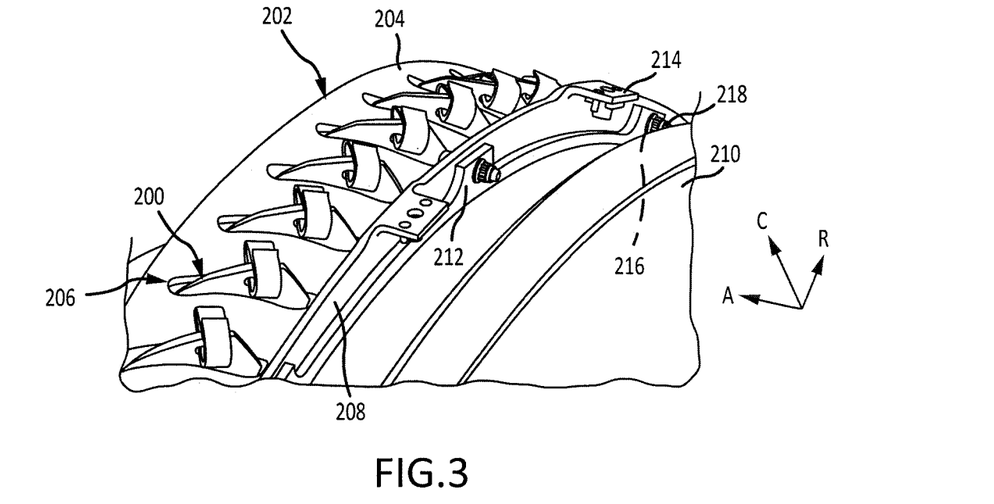
FIG. 3 is a perspective view of an outer diameter shroud and a plurality of fan exit stators of a gas turbine engine, in accordance with various embodiments.

Referring now to FIG. 3, an outer diameter shroud 202 may be coupled to a case of a gas turbine engine, such as a FCB 210. The outer diameter shroud 202 may include features designed to resist radially outward movement.

The annular body 204 may extend in the axial direction and define a plurality of slots 206. Each of the plurality of slots 206 may be designed to receive a portion of one of a plurality of stators 200, such as fan exit stators. For example, each of the plurality of slots 206 may be designed to receive an outer diameter end of one of the plurality of stators 200. In various embodiments, each of the plurality of stators 200 may be double potted, such as with a rubber potting or a polyurethane potting. In that regard, potting may cause the stators 200 to remain in place relative to an inner diameter shroud and the outer diameter shroud 202.

The shroud flange 208 may extend in the radial direction and be designed to be coupled to the FCB 210. For example, the shroud flange 208 may be designed to be fastened to the FCB 210 at case flanges 212 of the FCB 210. As shown in FIG. 3, fasteners 218, such as screws, bolts, rivets, or the like, may extend through fastener holes 216 of the shroud flange 208 and each of the case flanges 212 to fasten the shroud flange 208 to the FCB 210.

The shroud flange 208 may extend around the entire circumference of the outer diameter shroud 202. This design feature provides increased rigidity to the outer diameter shroud 202 at circumferential locations away from the locations of the fasteners 218, thus reducing potential deflection of the outer diameter shroud 202 in response to contact with an object.

The single integral annular body 204 of the outer diameter shroud 202 provides additional rigidity over designs that include a forward outer diameter shroud and an aft outer diameter shroud. Outer diameter shrouds that include multiple pieces may have a forward outer diameter shroud that deflects at the junction with the aft outer diameter shroud due to the type of coupling. This type of deflection may tend to be prevented by use of a single outer diameter shroud.

The outer diameter shroud 202 may further include a plurality of brackets including a bracket 214. The bracket 214 may extend aft from the radially outward end of the shroud flange 208 and may be foil led integral with the shroud flange 208 or may be a separate component from the shroud flange 208. In that regard, the bracket 214 may extend from the shroud flange 208 in a direction away from the annular body 204. The bracket 214 may be designed to be fastened to a splitter of a gas turbine engine.

Figure 4:
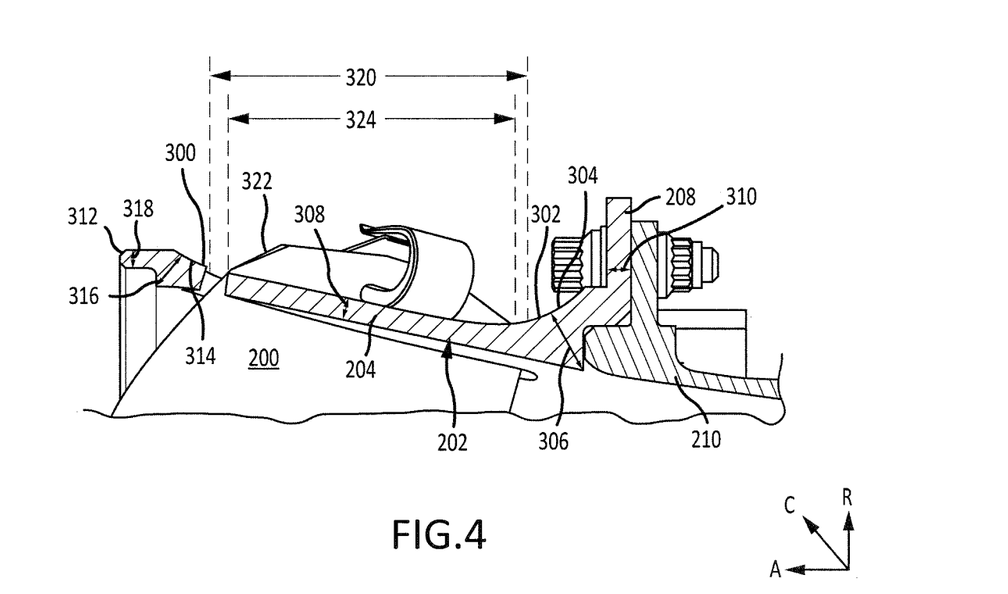
FIG. 4 is a cross-sectional view of the outer diameter shroud of FIG. 3, in accordance with various embodiments.

Referring to FIG. 4, additional features of the outer diameter shroud 202 are shown. In particular, the annular body 204 has a forward end 300 and an aft end 302. The shroud flange 208 is coupled to the aft end 302 of the annular body 204 and a flange transition 304 is located at the junction of the shroud flange 208 and the annular body 204.

The annular body 204 has a body thickness 308, and the shroud flange 208 has a flange thickness 310. The flange transition 304 includes a flange transition thickness 306 that is greater than the body thickness 308 and the flange thickness 310. This feature increases rigidity of the annular body 204, resulting in a tendency for reduced deflection of the annular body 204 in response to contact with an object.

The outer diameter shroud 202 further includes a lip 312 extending axially forward from the forward end 300 of the annular body 204. The lip 312 may be formed integral with the other components of the outer diameter shroud 202. The outer diameter shroud 202 may further include a lip transition 314 at the junction of the forward end 300 of the annular body 204 and the lip 312. The lip 312 may have a lip thickness 318 and the lip transition 314 may have a lip transition thickness 316. The lip transition thickness 316 may be greater than the lip thickness 318 and the body thickness 308. The relatively large thickness of the lip transition 314 increases rigidity of the annular body 204, resulting in reduced deflection of the annular body 204 in response to contact with an object.

The annular body 204 may have a body axial length 320, and an outer diameter edge 322 of one of the plurality of stators 200 may have an edge axial length 324. The body axial length 320 may be greater than the edge axial length 324 of the outer diameter edge 322 of the stators 200. In that regard, the annular body 204 may comprise a single integral piece of material which, as described above, increases rigidity of the annular body 204 relative to an outer diameter shroud having multiple components coupled together.

Figure 5:
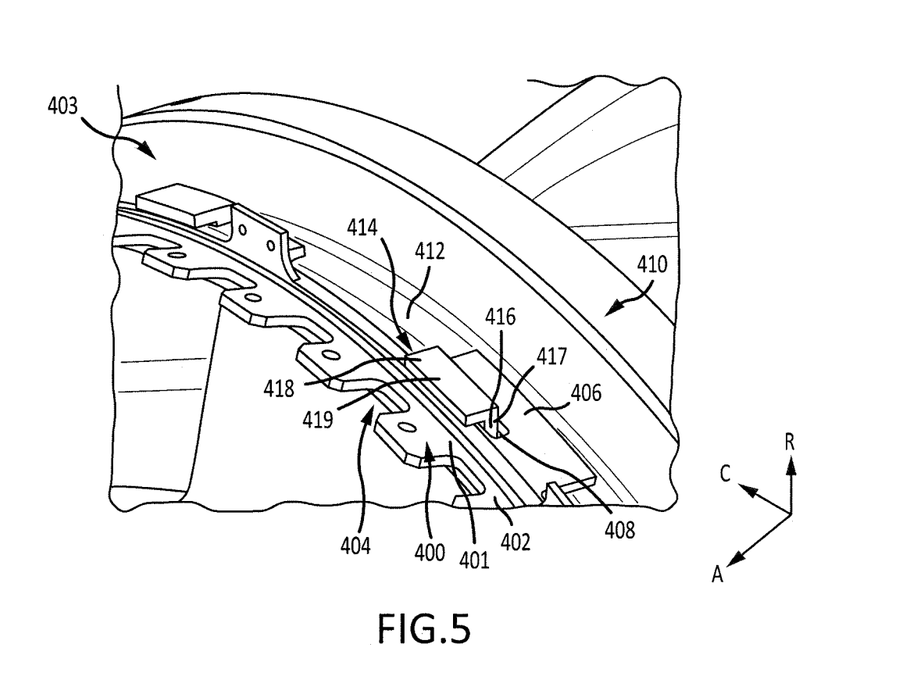
FIG. 5 is a perspective view of an aft outer diameter shroud and a front center body of a gas turbine engine having an axial hook for reducing deflection of the outer diameter shroud, in accordance with various embodiments.

Turning now to FIG. 5, a system 403 that includes an outer diameter shroud 400 and an annular case 410 (such as a FCB) may include various features for reducing radial deflection of the outer diameter shroud 400. The outer diameter shroud 400 includes multiple pieces including an aft outer diameter shroud 401. The aft outer diameter shroud 401 includes an annular body 402 that defines a plurality of slots 404 each designed to receive a portion of a stator, such as a fan exit stator. The aft outer diameter shroud 401 further includes a bayonet 406 extending axially aft from the annular body 402. The bayonet 406 defines a bayonet slot 408 which may be a circumferential slot.

The annular case 410 includes a case body 412 and a hook 414. The hook 414 includes a first portion 416 and a second portion 418. The first portion 416 of the hook 414 may be referred to as a radial portion 417 as it extends away from the case body 412 in the radial direction. The radial portion 417 is designed to be received by the bayonet slot 408 to couple the aft outer diameter shroud 401 to the annular case 410.

The second portion 418 of the hook 414 may be referred to as an axial portion 419 as it extends away from the case body 412 in the axially forward direction. The axial portion 419 is designed to extend over a portion of the aft outer diameter shroud 401 in the axial direction. Stated differently, the axial portion 419 is designed to be positioned radially outward from and contact a portion of the aft outer diameter shroud 401. In various embodiments, the hook 414 may be used with a single-piece outer diameter shroud to resist deflection of the single-piece outer diameter shroud.

Contact between the axial portion 419 and the aft outer diameter shroud 401 resists radially outward movement of the aft outer diameter shroud 401. In that regard, the axial portion 419 may be said to resist outward radial deflection of the aft outer diameter shroud 401 in response to contact with an object.

Similar advantages may be achieved by using hooks having different shapes. For example and referring to FIG. 6, a system 503 that includes an outer diameter shroud 500 and an annular case 510 (such as a FCB) may include various features for reducing radial deflection of the outer diameter shroud 500. The outer diameter shroud 500 includes multiple pieces including an aft outer diameter shroud 501. The aft outer diameter shroud 501 includes an annular body 502 that defines a plurality of slots 504 each designed to receive a stator, such as a fan exit stator. The aft outer diameter shroud 501 further includes a bayonet 506 extending axially aft from the annular body 502. The bayonet 506 defines a bayonet slot 508 which may be a circumferential slot.

Figure 6:
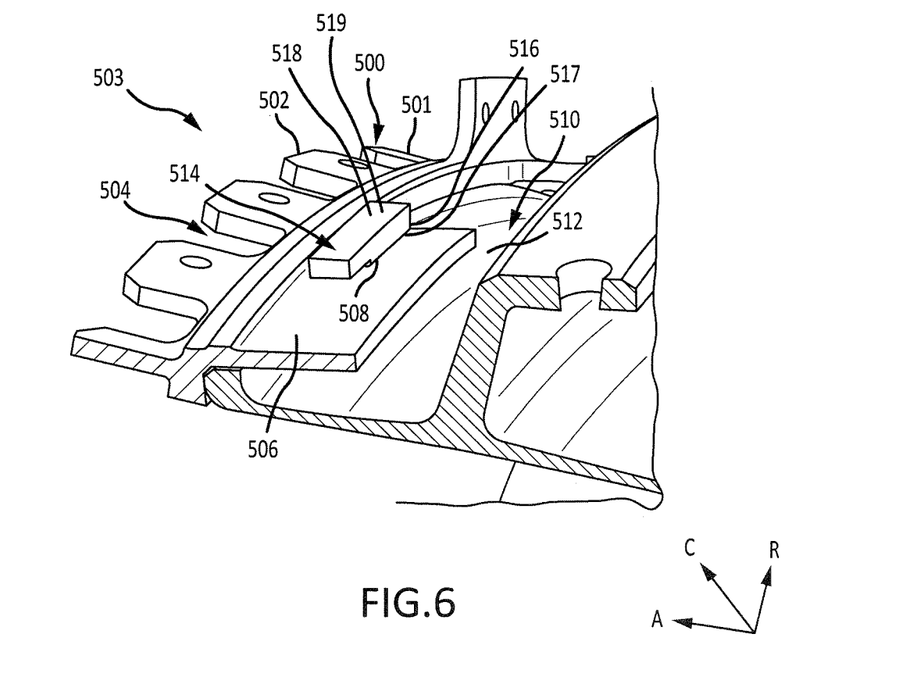
FIG. 6 is a perspective view of an aft outer diameter shroud and a front center body of a gas turbine engine having a circumferential hook for reducing deflection of the outer diameter shroud, in accordance with various embodiments.

The annular case 510 includes a case body 512 and a hook 514. The hook 514 includes a first portion 516 and a second portion 518. The first portion 516 of the hook 514 may be referred to as a radial portion 517 as it extends away from the case body 512 in the radial direction. The radial portion 517 is designed to be received by the bayonet slot 508 in order to couple the aft outer diameter shroud 501 to the annular case 510. A hook may include any object having a first portion extending in a first direction and a second portion extending in a second direction that is different than the first direction.

The second portion 518 of the hook 514 may be referred to as a circumferential portion 519 as it extends away from the radial portion 517 in a circumferential direction. The circumferential portion 519 is designed to extend over a portion of the bayonet 506 in the circumferential direction. Stated differently, the circumferential portion 519 is designed to be positioned radially outward from and contact a portion of the bayonet 506.

Contact between the circumferential portion 519 and the bayonet 506 resists radially outward movement of the bayonet 506. Because the bayonet 506 is coupled to the annular body 502, the contact between the circumferential portion 519 and the bayonet 506 resists radially outward movement of the aft outer diameter shroud 501. In that regard, the circumferential portion 519 may be said to resist outward radial deflection of the aft outer diameter shroud 501 in response to contact with an object.

Figure 7:
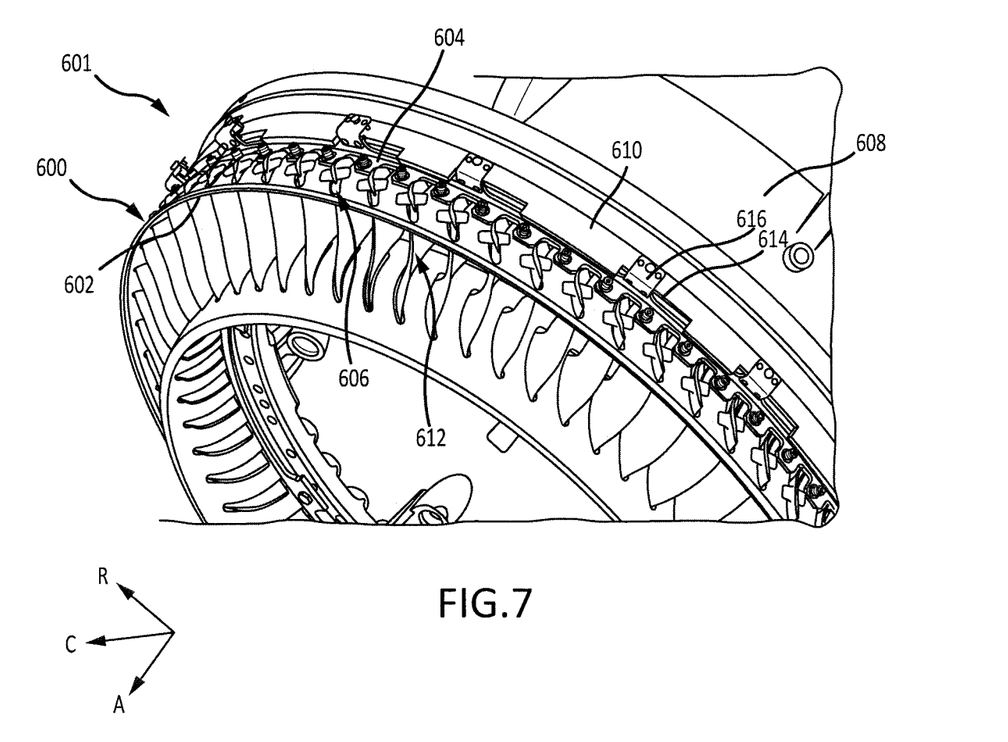
FIG. 7 is a perspective view of a system for reducing deflection of an outer diameter shroud, the system including a band positioned radially outward from the outer diameter shroud, in accordance with various embodiments.

Referring to FIG. 7, a system 601 for reducing radial deflection of an outer diameter shroud 600 is shown. The system 601 includes the outer diameter shroud 600, an annular case 608 (such as a FCB), and a band 610. The outer diameter shroud 600 may include a forward outer diameter shroud 602 and an aft outer diameter shroud 604. The outer diameter shroud 600 includes a plurality of slots 606 each designed to receive one of a plurality of stators 612, such as fan exit stators.

The band 610 is positioned radially outward from a portion of the outer diameter shroud 600 and a portion of the case 608. The band 610 may contact one or both of the forward outer diameter shroud 602 or the aft outer diameter shroud 604. In various embodiments, the band 610 may be used with a single-piece outer diameter shroud to resist deflection of the single-piece outer diameter shroud. As shown in FIG. 7, the band 610 contacts the aft outer diameter shroud 604 and the case 608. Contact between the band 610 and the outer diameter shroud 600 resists radially outward movement of the outer diameter shroud 600. In that regard, the band 610 may be said to resist radial deflection of the outer diameter shroud 600 in response to contact with an object.

The band 610 may include any of a plurality of materials such as a plastic, a rubber, silicone, a metal, or the like. The band 610 may extend around the entire circumference of the outer diameter shroud 600. The band 610 may further define a plurality of openings 614 each designed to be aligned with the one of a plurality of tabs 616 of the outer diameter shroud 600. The tabs 616 may, for example, be used to couple the outer diameter shroud 600 to a splitter of a gas turbine engine.

While the disclosure is described with reference to exemplary embodiments, it will be understood by those skilled in the art that various changes may be made and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of a, b, or c" is used in the claims, it is intended that the phrase be interpreted to mean that a alone may be present in an embodiment, b alone may be present in an embodiment, c alone may be present in an embodiment, or that any combination of the elements a, b and c may be present in a single embodiment; for example, a and b, a and c, b and c, or a and b and c. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for retaining stators of a gas turbine engine having an axis, the outer diameter shroud comprising:
    an annular body positioned around the axis, extending in an axial direction, and defining a plurality of slots each configured to receive a portion of one of a plurality of stators;
    a shroud flange coupled to the annular body, extending in a direction perpendicular to a tangent of the annular body, and configured to be fastened to a case of the gas turbine engine; and
    a stator being double potted and having an outer diameter end configured to be received by one of the plurality of slots defined by the annular body.

2. The system of claim 1, wherein the plurality of stators includes fan exit stators configured to condition a core airflow received from a fan section of the gas turbine engine.

3. The system of claim 1, further comprising a flange transition that is curved, extends from the annular body to the shroud flange, and has a flange transition thickness that is greater than a body thickness of the annular body and is also greater than a flange thickness of the shroud flange.

4. The system of claim 1, wherein the case is a front center body of the gas turbine engine.

5. The system of claim 1, wherein the shroud flange is coupled to an aft end of the annular body and formed integrally with the annular body.

6. The system of claim 5, further comprising:
    a lip extending axially forward from the annular body away from the shroud flange; and
    a lip transition that is curved, extends from the annular body to the lip, and has a lip transition thickness that is greater than a body thickness of the annular body and is also greater than a lip thickness of the lip.

7. The system of claim 1, further comprising a bracket extending from the shroud flange away from the annular body in the axial direction, the bracket formed integrally with the shroud flange and configured to be coupled to a splitter of the gas turbine engine.

8. The system of claim 1, wherein the annular body has a body axial length that is greater than an edge axial length of an outer diameter edge of each of the plurality of stators.

9. The system of claim 1, wherein the annular body has a forward end and an aft end that is positioned nearer the axis than the forward end.

10. The system of claim 1, wherein the shroud flange defines a plurality of fastener holes configured to receive fasteners for fastening the shroud flange to the case of the gas turbine engine.

11. A system for retaining a stator of a gas turbine engine having an axis, the system comprising:
    an outer diameter shroud having:

an annular body defining a plurality of slots each configured to receive a portion of one of a plurality of stators, and a bayonet extending aft from the annular body and defining a bayonet slot that extends circumferentially; and an annular case having a case body and a hook that includes a first portion configured to be received by the bayonet slot and a second portion configured to extend over a portion of the outer diameter shroud to resist radially outward movement of the outer diameter shroud relative to the axis axis, wherein the first portion is a radial portion extending radially outward from the case body and the second portion is an axial portion extending axially forward from the radial portion, the radial portion configured to be received by the bayonet slot and the axial portion configured to extend over the annular body.

12. The system of claim 11, wherein the first portion is a radial portion extending radially outward from the case body and the further comprising a stator being double potted and having an outer diameter end configured to be received by one of the plurality of slots defined by the annular body.

13. The system of claim 11, wherein the annular case is a front center body of the gas turbine engine.

14. The system of claim 11, wherein the plurality of stators includes fan exit stators configured to condition a core airflow received from a fan section of the gas turbine engine.

15. The system of claim 11, wherein the outer diameter shroud includes a forward outer diameter shroud and an aft outer diameter shroud, and the bayonet is coupled to the aft outer diameter shroud.

16. A system for retaining stators of a gas turbine engine having an axis, the system comprising:

an outer diameter shroud having an annular shape and defining a plurality of slots each configured to receive a portion of one of a plurality of stators;

an annular case configured to be coupled to the outer diameter shroud;

a stator being double potted and having an outer diameter end configured to be received by one of the plurality of slots defined by the annular body; and a band configured to be positioned radially outward from the outer diameter shroud and to contact the outer diameter shroud to resist radially outward movement of the outer diameter shroud relative to the axis.

17. The system of claim 16, wherein the outer diameter shroud includes either a single-piece outer diameter shroud such that the band is configured to contact the single-piece outer diameter shroud, or a combination of a forward outer diameter shroud and an aft outer diameter shroud such that the band is configured to contact the aft outer diameter shroud.

18. The system of claim 16, wherein the band is further configured to be positioned radially outward from the annular case and to contact the annular case and the outer diameter shroud.

19. The system of claim 16, wherein the plurality of stators includes fan exit stators configured to condition a core airflow received from a fan section of the gas turbine engine and the annular case is a front center body of the gas turbine engine.

* * * * *

UNITED STATES PATENT AND TRADEMARK OFFICE
CERTIFICATE OF CORRECTION

PATENT NO. : 10,557,412 B2
APPLICATION NO. : 15/608547
DATED : February 11, 2020
INVENTOR(S) : Paul W. Baumann Page 1 of 1

It is certified that error appears in the above-identified patent and that said Letters Patent is hereby corrected as shown below:

Claim 11 - In Column 11, Line 12 please delete the first "axis".

Signed and Sealed this
Sixth Day of October, 2020

Andrei Iancu
*Director of the United States Patent and Trademark Office*